(12) United States Patent
Van Kleef et al.

(10) Patent No.: US 9,968,080 B1
(45) Date of Patent: May 15, 2018

(54) PEST CONTROL LIGHTING DEVICE

(71) Applicants: Paul Van Kleef, Los Angeles, CA (US); Max Azria, Los Angeles, AA (US); Robert M. McFarlane, Los Angeles, CA (US); Yasmine Hanane, Los Angeles, CA (US)

(72) Inventors: Paul Van Kleef, Los Angeles, CA (US); Max Azria, Los Angeles, AA (US); Robert M. McFarlane, Los Angeles, CA (US); Yasmine Hanane, Los Angeles, CA (US)

(73) Assignee: Clean Concept LLC, West Hollywood, CA (US)

(*) Notice: Subject to any disclaimer, the term of this patent is extended or adjusted under 35 U.S.C. 154(b) by 0 days. days.

(21) Appl. No.: 15/462,716

(22) Filed: Mar. 17, 2017

Related U.S. Application Data (60) Provisional application No. 62/460,738, filed on Feb. 17, 2017.

(51) Int. Cl.
| | |
|---|---|
| *F21V 9/00* | (2015.01) |
| *A01M 1/14* | (2006.01) |
| *A01M 29/18* | (2011.01) |
| *A01M 29/10* | (2011.01) |
| *F21V 23/06* | (2006.01) |
| *F21V 15/01* | (2006.01) |

(52) U.S. Cl.
CPC ............ *A01M 1/145* (2013.01); *A01M 29/10* (2013.01); *A01M 29/18* (2013.01); *F21V 15/01* (2013.01); *F21V 23/06* (2013.01)

(58) Field of Classification Search
CPC ...... A01M 1/145; A01M 29/10; A01M 29/18; F21V 15/01; F21V 23/06
USPC ........................................................ 362/230
See application file for complete search history.

(56) References Cited

U.S. PATENT DOCUMENTS

| | | | |
|---|---|---|---|
| 7,318,659 B2 * | 1/2008 | Demarest ............. | A61M 11/041 362/253 |
| 2010/0085729 A1 * | 4/2010 | Jiang ................... | F21V 33/0056 362/86 |
| 2015/0049461 A1 * | 2/2015 | Yotsumoto .......... | F21V 33/0056 362/86 |
| 2016/0262367 A1 * | 9/2016 | Sandford ............. | A01M 1/145 |

* cited by examiner

*Primary Examiner* — Elmito Breval
*Assistant Examiner* — Jessica M Apenteng
(74) *Attorney, Agent, or Firm* — Kelley Drye & Warren LLP (57) ABSTRACT

A pest control lighting device having a connector capable of electrically connecting to a common lightbulb socket or electrical outlet. The pest control lighting device includes one or more light sources in electrical connection with the connector. The pest control lighting device may include an inner module capable of holding one or more pest control materials, such as an insect repellent. The pest control lighting device may further include sound emitting components that may be capable of emitting an ultrasonic sound.

13 Claims, 13 Drawing Sheets

PEST CONTROL LIGHTING DEVICE

CROSS-REFERENCE TO RELATED APPLICATIONS

This application claims the benefit of U.S. Provisional Patent Application No. 62/460,738, filed Feb. 17, 2017. The entire contents of that application are incorporated herein by reference.

FIELD OF THE INVENTION

This invention relates to the field of pest control and, more particularly, to a lighting device having an inner chamber for receiving pest control material and/or one or more sound emitters designed to repel pests.

BACKGROUND OF THE INVENTION

Various means exist for controlling pests, including insects and rodents, in or around the home. For example, adhesive strips, sometimes referred to as "glue traps" may be used to attract and eradicate pests. Pests may be attracted to a chemical attractant applied to a paper, and when a pest makes contact with the paper, an adhesive ensures that the pest remains stuck to the paper. Because pests cannot separate themselves from the paper, they ultimately die of thirst, hunger, or age. Handling glue traps, however, may be difficult because the adhesive is typically very strong and may inadvertently attach itself to the person installing the glue trap. Also, the glue trap may need to be installed away from where persons are expected to walk so that it does not accidentally adhere to people or pets. However, placing the glue trap in a remote location may reduce the likelihood that it will attract and trap pests.

Another means for addressing pests—typically insects—is by candles, such as Citronella candles. The candles emit a scent that may repel insects. However, candles are a potential fire hazard and often produce unwanted smoke and wax drippings.

Other existing devices for attracting and killing insects, sometimes referred to as "bug zappers," typically include a light source surrounded by high-voltage, electrically charged metal elements. Many flying insects, including mosquitos, are drawn to the light source, and are electrocuted when they make contact with the charged elements. Some bug zappers need to be placed on the floor or another flat surface and may be accidentally contacted by persons or pets passing near the bug zapper. Certain bug zappers may be suspended from a post or a ceiling, but mounting the bug zappers can be difficult and/or time consuming, and may still be accidentally contacted by persons passing near the bug zapper. Also, bug zappers typically need to be plugged into an electric socket, further complicating installation.

Some existing lighting devices are capable of connecting to lightbulb sockets and emitting insect control material. For example, U.S. Pat. No. 7,246,919, issued to Porchia et al., discloses a screw-in lightbulb with a dispenser that may be used to evaporate and emit fragrances and other active ingredients, including an insect control substance such as an insecticide or insect attractant. However, the active ingredient dispenser is contained within the base and is not placed in proximity to the light sources and/or used with an adhesive chemical to eradicate insects. Also, the placement of insect control material near a ceiling or lamp light socket may not control pests that scurry along the floor, away from the insect control material.

There is therefore a need for improvements in pest control devices that overcome some or all of the previously described drawbacks of prior pest control options.

SUMMARY OF THE INVENTION

The present invention is directed to improved devices for pest control.

This invention describes a lighting device having a housing and an inner module inserted within the housing of the device. The housing of the device has one or more light sources that may emit light in the visible spectrum, infra-red spectrum, and/or the ultraviolet spectrum. The spectrum of light may be chosen to attract or repel pests.

The inner module may be held within the housing by one or more magnets, screw threads that mate the inner module to the housing, and/or a bayonet connection located at one end or both ends of the inner module. The inner module may include pest control material, such as a pest attractant, a pest repellant, and/or an adhesive. The inner module may be removed from the housing and replaced with a new inner module. The inner module may be replaced, for example, when the pest control material has evaporated or is no longer effective, or when a number of pests have adhered to an adhesive within the inner module or applied to a surface of the inner module.

In an alternate embodiment, the invention describes a lighting device having a housing and an inner chamber for receiving pest control material. The pest control material may include a pest attractant, a pests repellant, and/or an adhesive. The pest control material may be removed from the chamber and replaced with new pest control material when, for example, the active ingredient of the pest control material has evaporated or is no longer effective, or when a number of pests have adhered to an adhesive that is at least a part of the insect control material.

Numerous variations may be practiced in the preferred embodiment.

BRIEF DESCRIPTION OF THE DRAWINGS

A further understanding of the invention can be obtained by reference to embodiments set forth in the illustrations of the accompanying drawings. Although the illustrated embodiments are merely exemplary of systems, methods, and apparatuses for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended hereto or as subsequently amended, but merely to clarify and exemplify the invention.

DETAILED DESCRIPTION OF THE INVENTION

The invention may be understood more readily by reference to the following detailed descriptions of preferred embodiments of the invention. However, techniques, systems, and operating structures in accordance with the invention may be embodied in a wide variety of forms and modes, some of which may be quite different from those in the disclosed embodiments. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Figure 1:
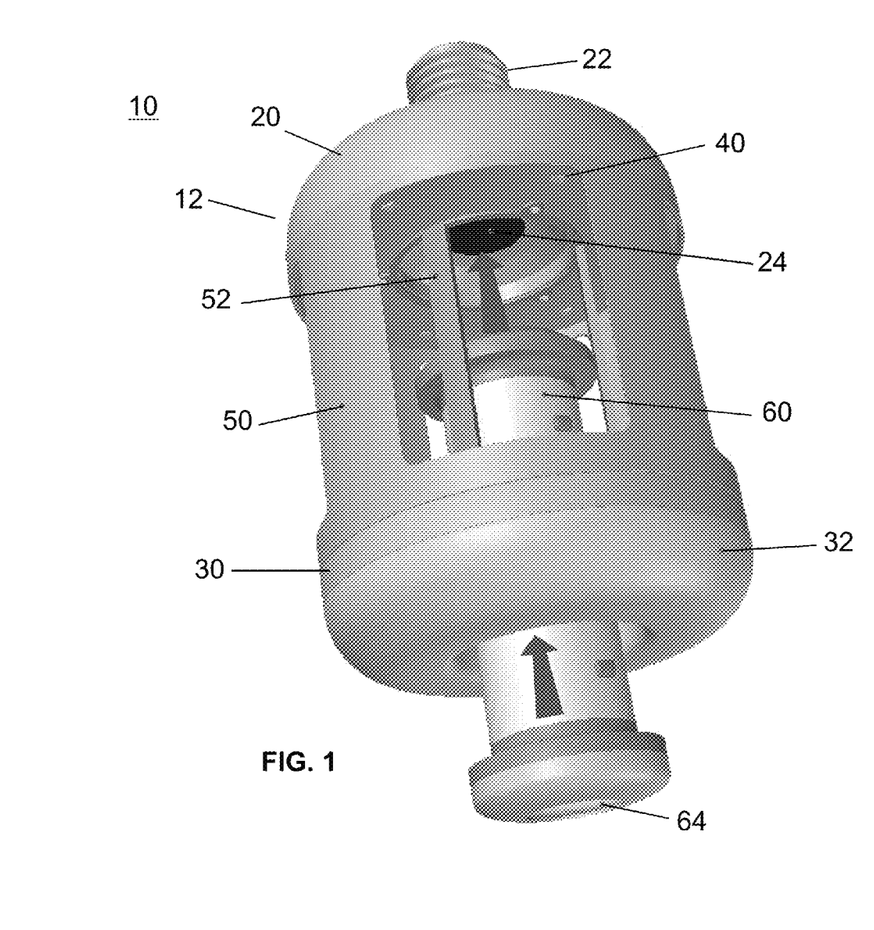
FIG. 1 depicts a perspective view of an embodiment of the invention.

Referring to FIG. 1, there is shown a first embodiment of a pest control lighting device (10) in accordance with the present invention. Lighting device (10) includes a housing (12) having a first end (20) and a second end (30) connected by a first set of one or more pillars (50), forming an open, central region of housing (12). Housing (12) is further depicted in FIG. 2.

Figure 2:
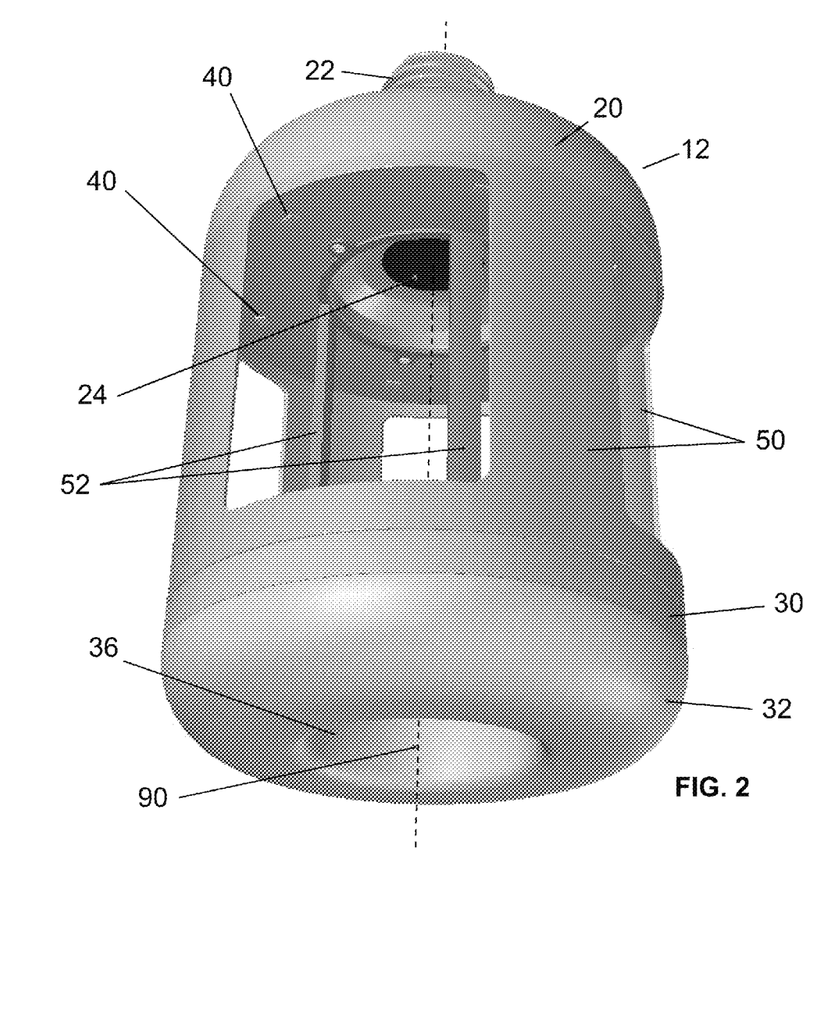
FIG. 2 depicts a perspective view of the housing shown in FIG. 1.

First end (20) and second end (30) may have a generally circular profile. First end (20) and second end (30) may be aligned along a center axis (90) that passes through the center of first end (20) and the center of second end (30). First set of pillars (50) may be arranged to connect the first end (20) and second end (30) at or near their outer circumference. In addition or in the alternative, a second set of pillars (52) may connect first end (20) and second end (30) and be situated within the outer circumference of first end (20) and second end (30). Preferably, however, second set of pillars (52) may be arranged equidistant from center axis (90).

Figure 3:
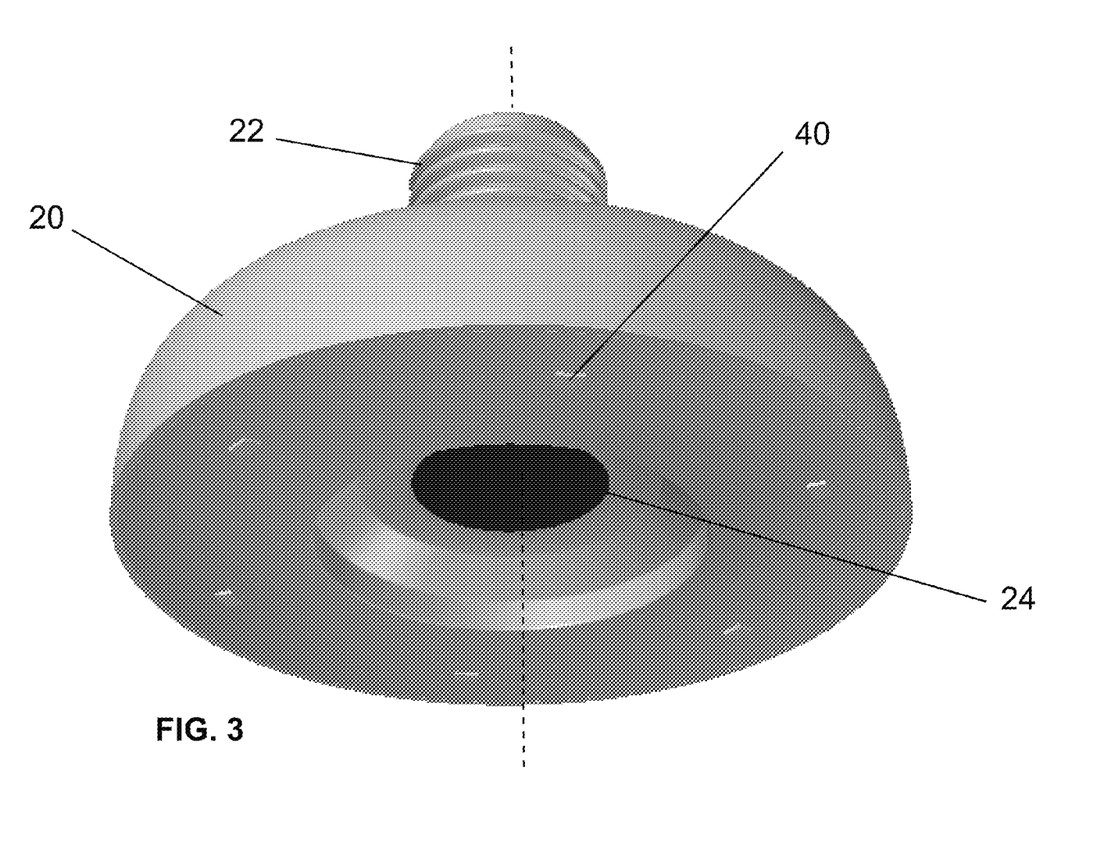
FIG. 3 depicts a perspective view of the first end of the housing shown in FIG. 2.

A perspective view of first end (20) is shown in FIG. 3. A lightbulb connector (22) may be attached to first end (20). Preferably, connector (22) may be attached to the top surface of first end (20), and the center axis of connector (22) may be aligned with center axis of first end (20). Connector (22) may be any connector capable of mating with a power source, such as a lightbulb socket or an electrical outlet. Preferably, connector (22) is an E26 or E27 lightbulb screw base. In the alternative or in addition, lighting device (10) may have a battery compartment for batteries (not shown) that may be used to power lighting device (10). A battery compartment may, for example, be located within first end (20) or second end (30). The battery compartment may be similarly structured to battery compartments typically found in common consumer electronic devices. The batteries may be replaceable by accessing the batteries via a battery compartment door.

First end (20) and/or the second end (30) may include one or more light sources (40). Light sources (40) may include, for example, light emitting diodes (LEDs). One or more light sources (40) may be capable of emitting light in the ultraviolet or infrared spectrum. In addition or in the alternative, one or more light sources (40) may be capable of emitting one or more colors in the visible light spectrum or a light output at one or more light temperatures. For example, a light source (40) may emit yellow light. As a further example, the light temperature may be approximately 2700K or 3500K. The light emitted may attract pests, or may not attract pests. Each light source (40) may be connected to and receive power from connector (22) and/or batteries in a battery compartment within housing (12).

Figure 4:
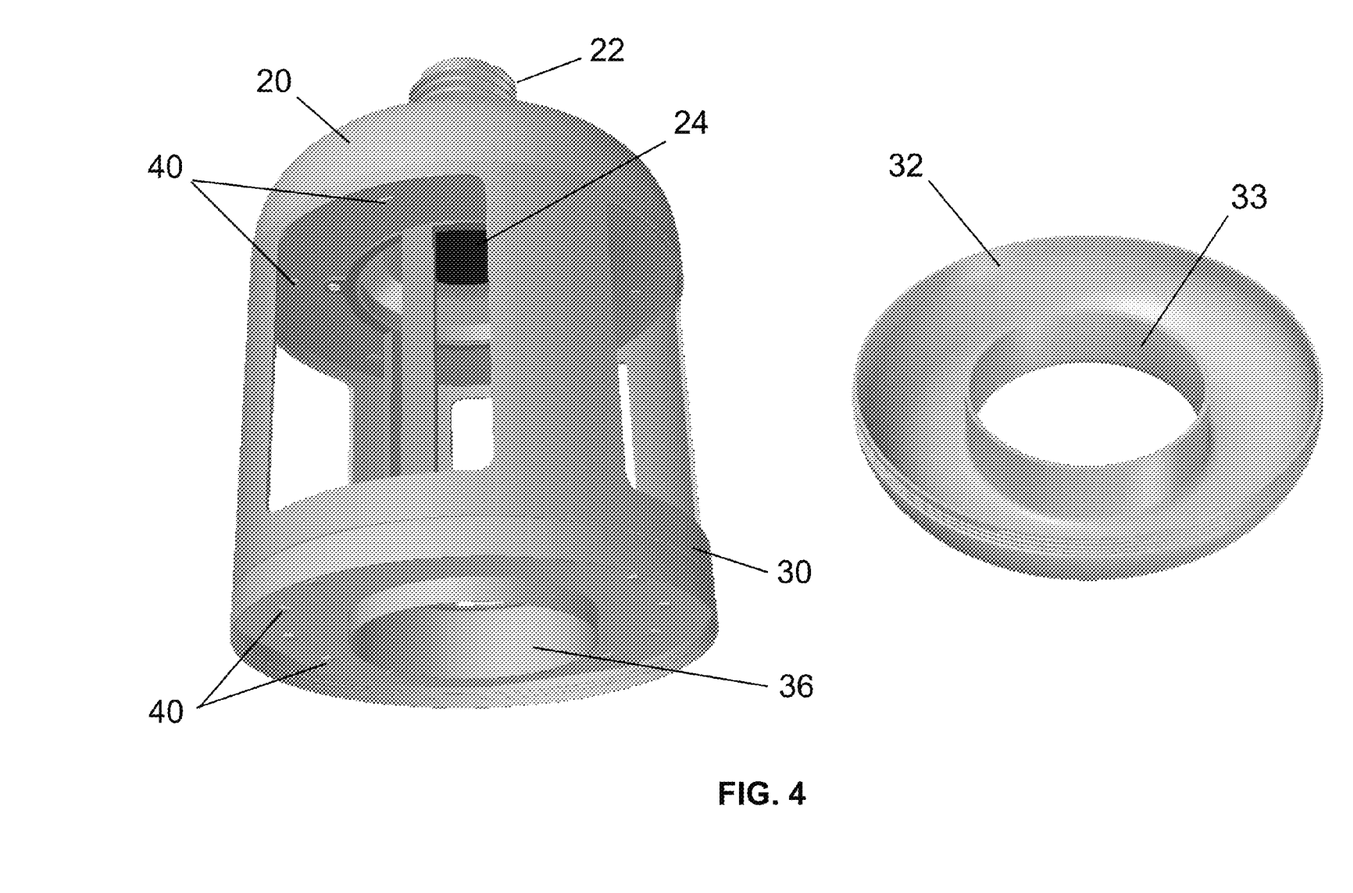
FIG. 4 depicts a perspective view of the housing shown in FIG. 1 with a light source cover removed.
Figure 5A:
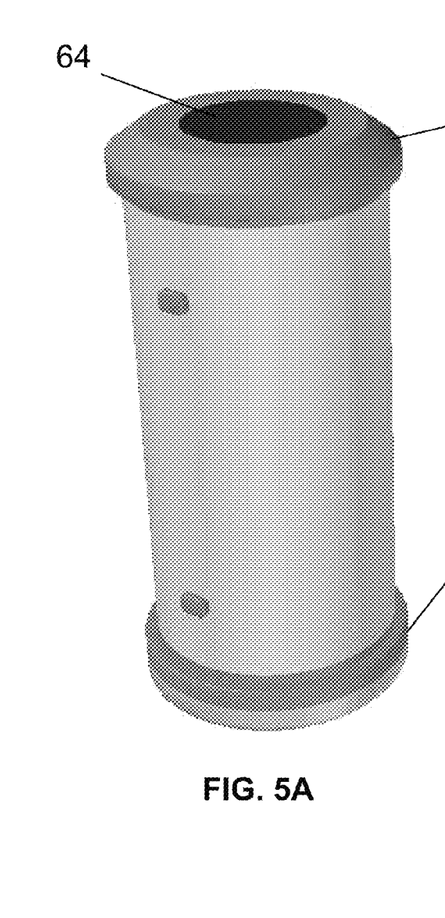
FIGS. 5A and 5B depict an example of an inner module.
Figure 5B:
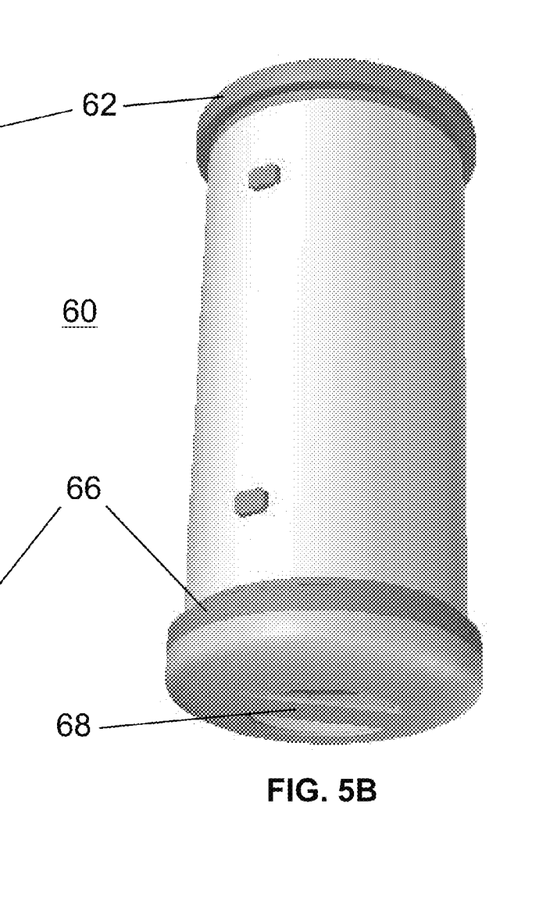

As depicted in FIG. 4, second end (30) may include a cover (32). The cover may be translucent or transparent to allow light emitted from one or more light sources (40) in the second end (30) to pass through cover (32). Cover (32) may be formed from colored translucent material, such as plastic, that causes the emitted light to have a particular hue, such as yellow. The type of light sources (40), the spectrum(s) of light, and/or the temperature(s) of light emitted from light sources (40) in first end (20) may be the same type of light sources (40), spectrum(s) of light, and/or temperature(s) of light emitted from light sources (40) in second end (30). In the alternative, the type of light sources (40), the spectrum(s) of light, and/or the temperature(s) of light emitted from light sources (40) in first end (20) may be different than the light sources (40), spectrum(s) of light, and/or temperature(s) of light emitted from light sources (40) in second end (30). In addition, each light source (40) within each end (20, 30) may be different and/or may emit different spectrum(s) of light, and/or temperature(s) of light than the other light sources (40) in that end (20, 30).

As shown in FIGS. 2 and 4, second end (30) may have an aperture (36) leading to the open, center region of housing (12), between first end (20) and second end (30). To the extent that second end (30) includes a cover (32), cover (32) may have an aperture (33) of the same shape and size as aperture (36). Aperture (33) may align with aperture (36) when cover (32) is applied to second end (30).

First end (20) may further include one or more magnets (24). As shown in FIG. 3, the one or more magnets may be preferably aligned with the center axis of first end (20). Also, as shown in FIG. 3, the one or more magnets may be located within a recess at the bottom surface of first end (20). In the alternative, first end (20) may have a flat bottom surface and one or more magnets (24) attached to the bottom surface.

Figure 10:
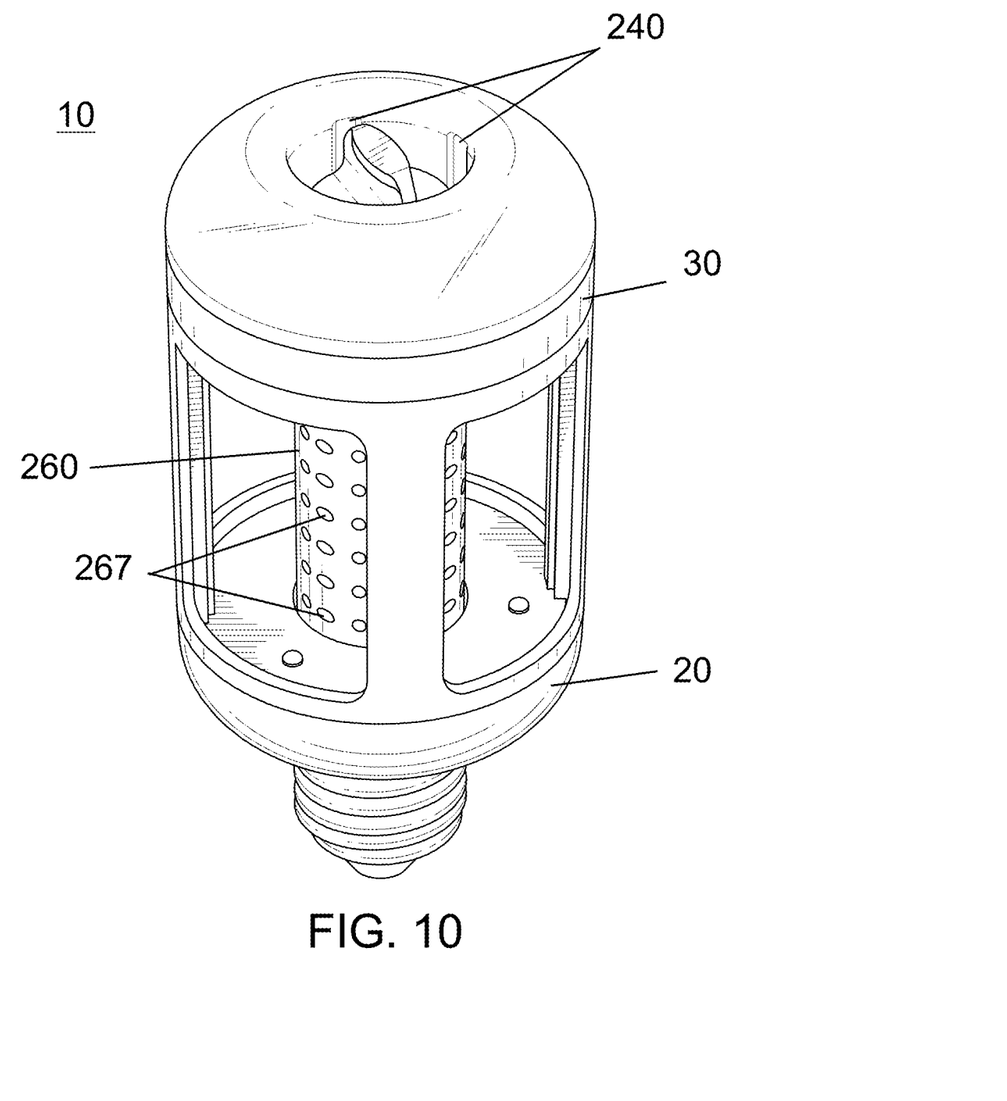
FIG. 10 depicts a perspective view of a further embodiment of the invention with an alternative inner module.
Figure 11:
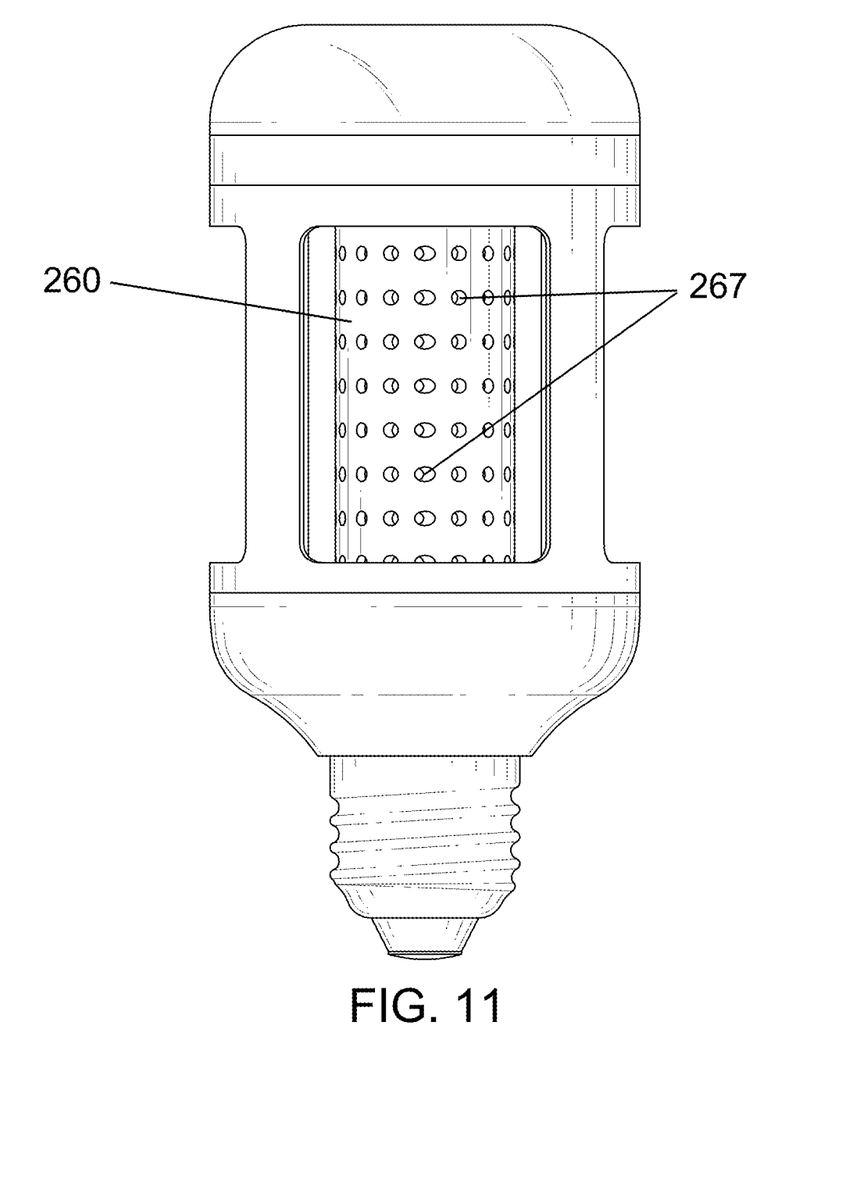
FIG. 11 depicts a side elevation view of the embodiment shown in FIG. 10.
Figure 12A:
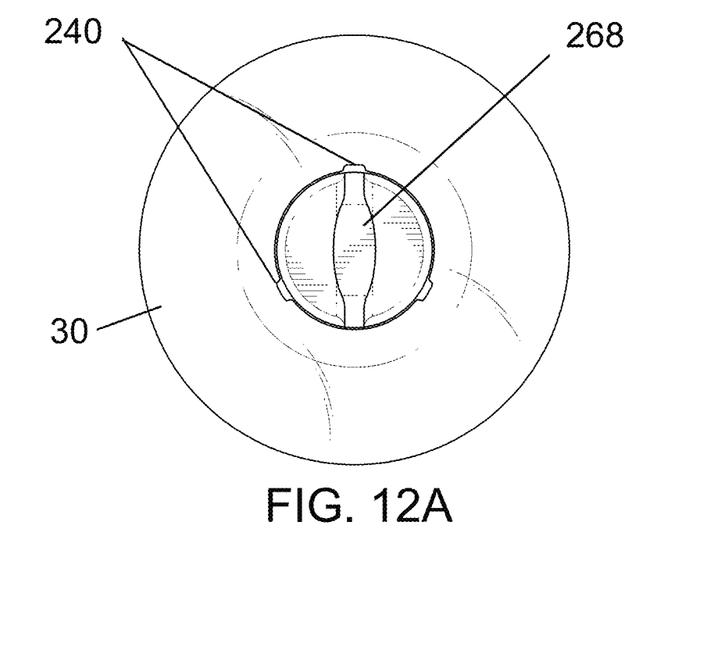
FIGS. 12A and 12B depict bottom views of the embodiment shown in FIG. 10.
Figure 12B:
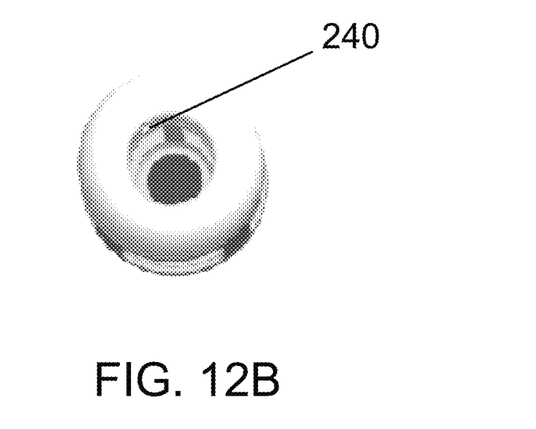
Figure 13A:
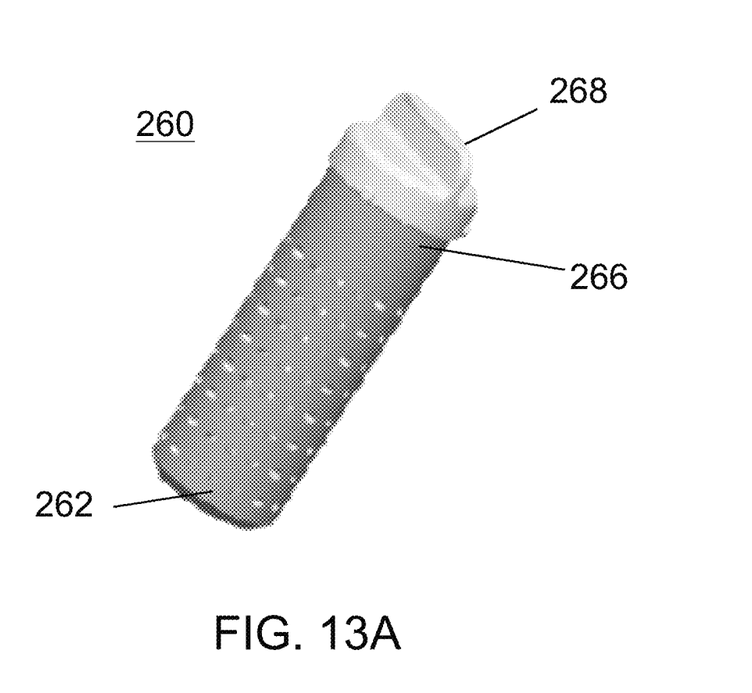
FIGS. 13A and 13B depict perspective views of the alternative inner module depicted in FIG. 10.
Figure 13B:
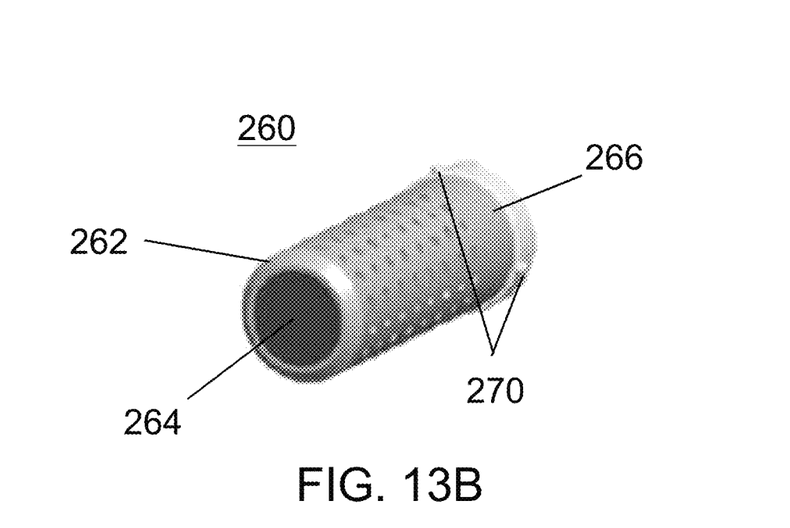

As shown in FIGS. 10, 12A, and 12B, second end (30) may include bayonet connection receptor slots (240). In addition or in the alternative, bayonet connection receptor slots may be included in first end (20).

Lighting device (10) may further include inner module (60, 260). As shown in FIGS. 5A, 5B, 13A and 13B, inner module (60, 260) may have a proximal end (62, 262) and a distal end (66, 266). Proximal end (62, 262) may have a magnet (64, 264) at or near the surface. Magnet (64, 264) may be magnetically attracted to magnet (24) in first end (20) of housing (12). Proximal end (62, 262) of inner module (60, 260) may be inserted through aperture (36) in second end (30).

Figure 6:
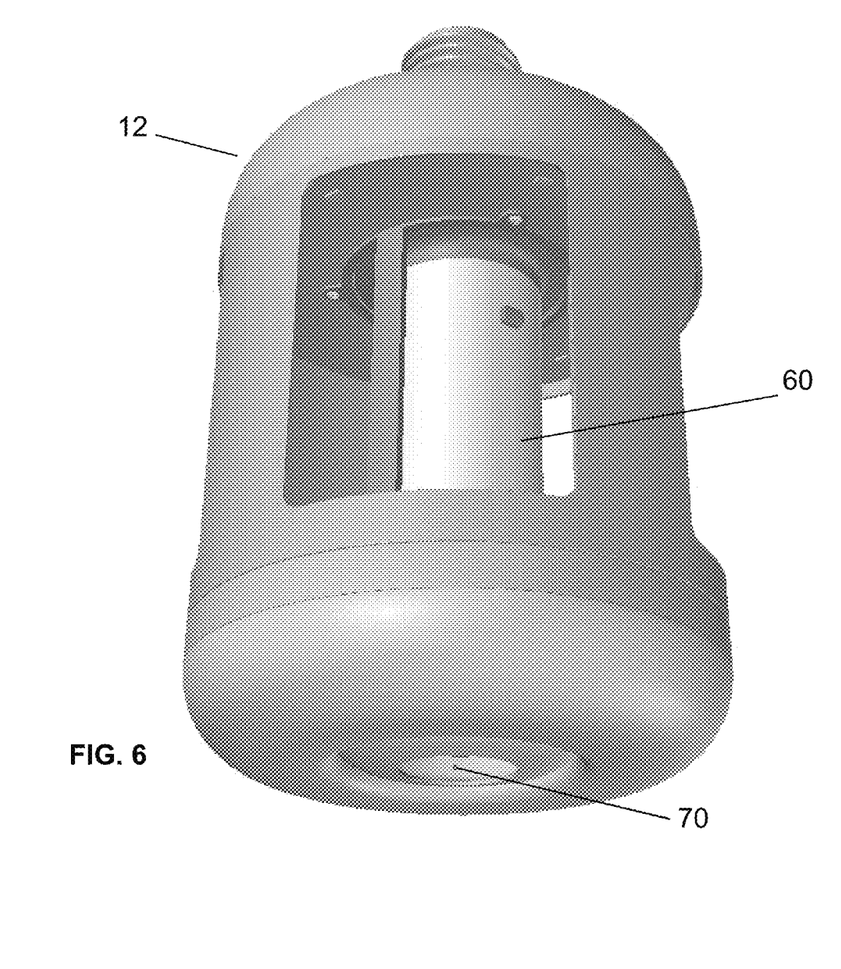
FIG. 6 depicts an inner module inserted into a housing.

As shown in FIG. 6, inner module (60, 260) may be fully inserted into housing (12) so that, for example, the distal end (66, 266) of inner module (60, 260) is situated within aperture (36) of second end (30). In the alternative, a portion of inner module (60, 260) may remain outside housing (12) when inner module (60, 260) is fully inserted, or distal end (66, 266) of inner module (60, 260) may be located some distance into housing (12) when inner module (60, 260) is fully inserted into housing (12). Inner module (60) is shown in FIG. 1 as partly inserted into housing (12). The arrows in FIG. 1 indicate the direction in which inner module (60, 260) may be inserted into housing (12).

Preferably, inner module (60, 260) may be inserted into housing (12) to the point where magnet (24) of first end (20) and magnet (64, 264) of inner module (60, 260) are in sufficiently close proximity to each other to create an attraction between magnet (24) and magnet (64, 264) strong enough to prevent inner module (60, 260) from falling out of housing (12) when first end (20) of housing (12) is oriented directly above second end (30) of housing (12), or when proximal end (62, 262) of inner module (60, 260) is oriented directly above distal end (66, 266) of inner module (60, 260).

In the alternative, magnet (24) of first end (20) of housing (12), or magnet (64, 264) at proximal end (62, 262) of inner module (60, 260) may be replaced by a metal attracted to a magnet (ferromagnetic). Preferably, the strength of the magnet and the size of the ferromagnetic material would be sufficient to prevent inner module (60, 260) from falling when housing (12) and/or inner module (60, 260) are oriented as described in the preceding paragraph.

In addition to magnet (24) and/or magnet (64, 264), or in the alternative, inner module (60, 260) may have one or more bayonet connection pins (270) at proximal end (62, 262) and/or at distal end (66, 266) that are capable of mating with bayonet connection receptor slots (240) in the first end (20) and/or the second end (30).

In the alternative, proximal end (62, 262) and/or distal end (66, 266) of inner module (60, 260) may include screw threads (not shown) that are capable of mating with screw threads at first end (20) of housing (12) and/or within aperture (36), respectively. Inner module (60, 260) may then be secured in housing (12) by engaging the screw threads of inner module (60, 260) with the screw threads at first end (20) of housing (12) and/or within aperture (36).

The distal end (66, 266) of inner module (60, 260) may have a handle (68, 268), a hole (70) (see FIG. 6), a notch, or other means for gripping distal end (66, 266) to facilitate removal of inner module (60, 260) from housing (12). In addition or in the alternative, at distal end (66) may include one or more magnets magnetically attracted to magnet (24), to allow inner module (60) to be magnetically held within housing (12) as described above regardless of whether the proximal end (62) or the distal end (66) are inserted first into housing (12).

Figure 7:
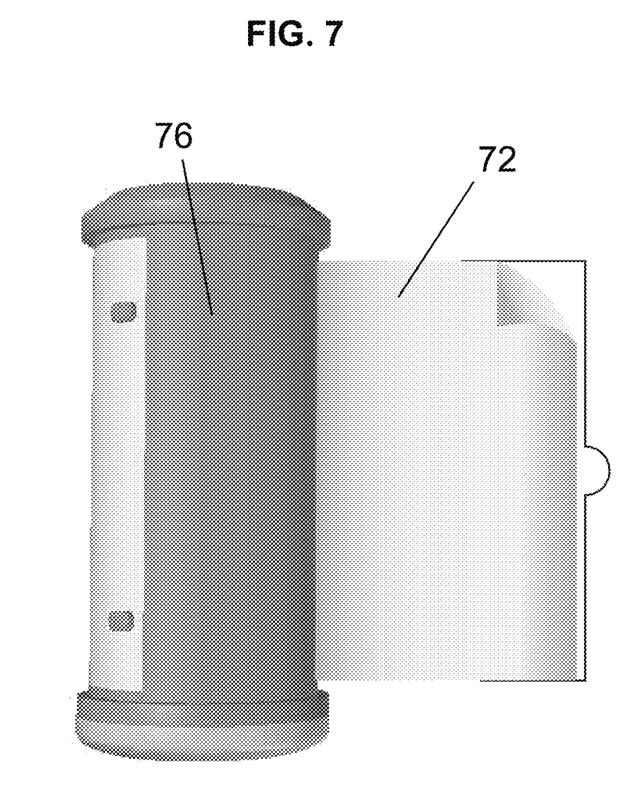
FIG. 7 depicts an inner module with a sheet rolled around a central post.

As shown in FIG. 7, inner module (60) may comprise a sheet of flexible material (70) wound around at least a center post (76). The sheet of material (70) may be longer than the circumference of center post (76), and may be unrolled to expose more of sheet (70). One or more of the pillars (50) or (52) may include ridges or edges that may be used to facilitate tearing sheet (70).

Sheet (70) may be coated with pest control material. The pest control material may be an insect attractant or an insect repellant. The pest control material may include, instead or in addition, an adhesive material capable of binding to the sheet insects that land on the sheet. The pest control material may comprise a mix of ammonia, L-lactic acid, tetradecanoic acid, 3-methyl-1-butanol and 1-butylamine. The pest control material may further include octanol.

In an alternative embodiment, pest control material may be applied directly to the surface of the inner module (60).

In that embodiment, inner module (60) would preferably have an absorbent surface to retain the pest control material.

Figures 8A, 8B:
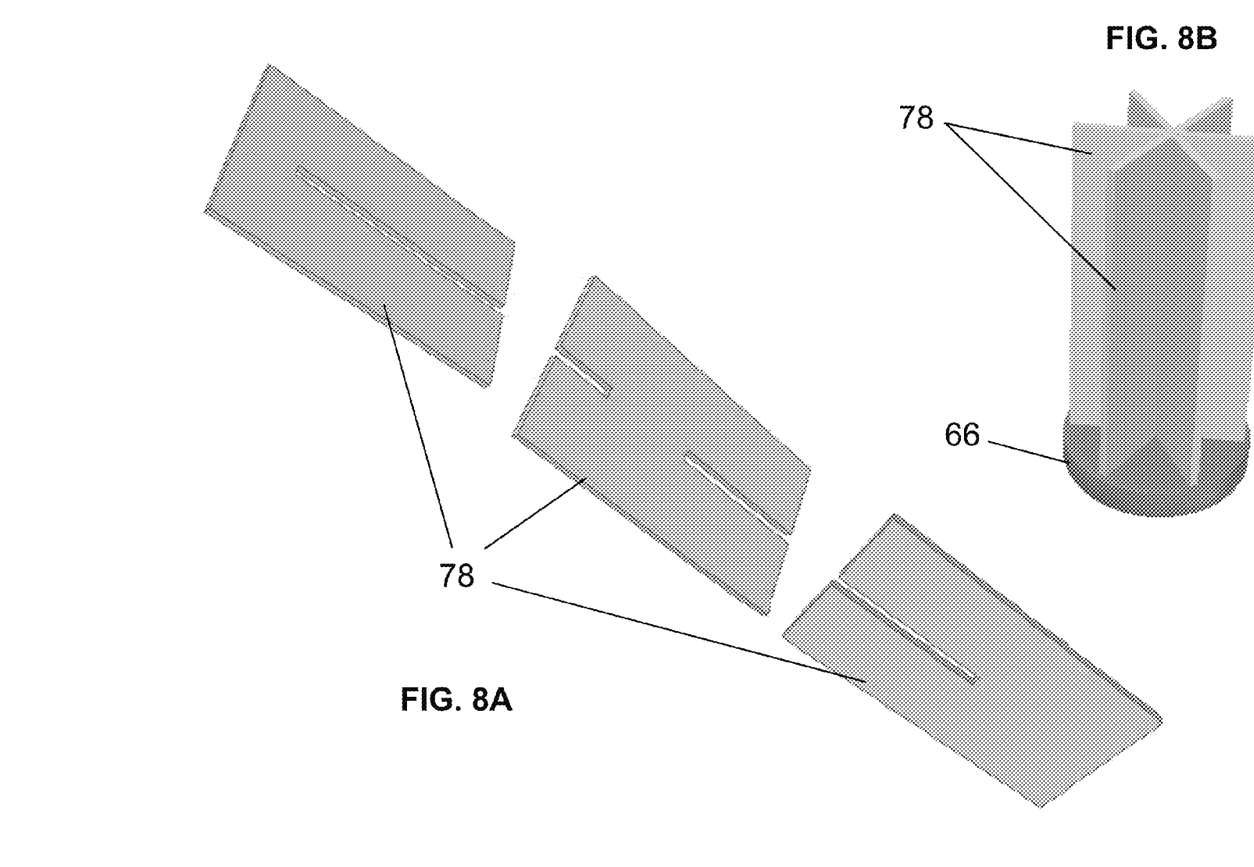
FIGS. 8A and 8B depict cards that form the center portion of an inner module.
Figure 9A:
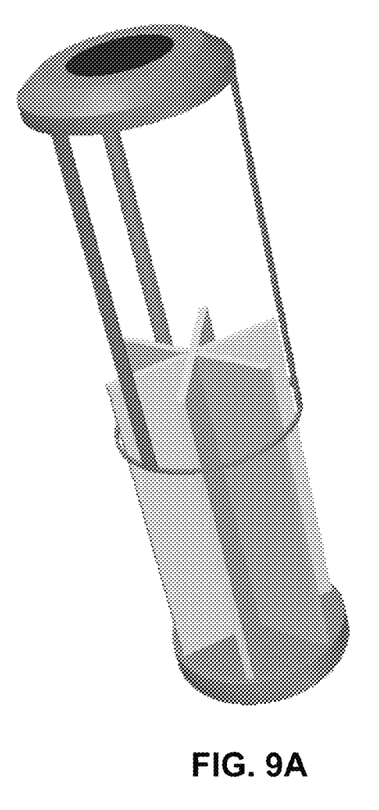
FIGS. 9A-9C depict the formation of an inner module having cards as the center portion.
Figure 9B:
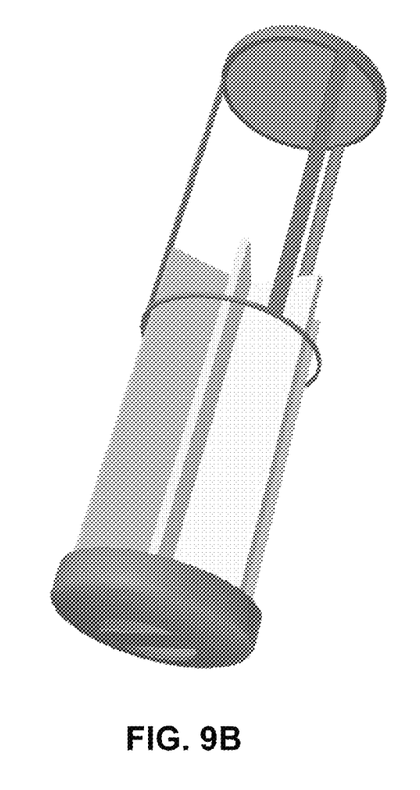
Figure 9C:
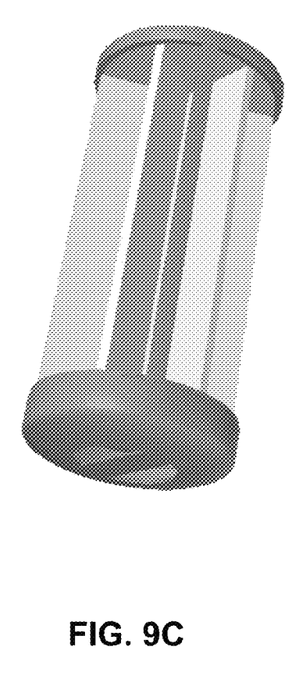

As shown in FIGS. 8A-8B, the center portion of inner module (60) may consist of one or more interlocking cards (78). Preferably, inner module (60) would include two to four cards (78). Three cards (78) are shown in FIGS. 8A-8B. FIG. 8B shows the three cards (78) from FIG. 8A assembled as the center portion of inner module (60). The cards (78) may be coated with pest control material. The cards (78) may be connected to proximal end (62) and distal end (66) of inner module (60) by an adhesive, or by inserting the ends of cards (78) into corresponding recesses in the inner facing surfaces of proximal end (62) and distal end (66). As shown in FIGS. 9A-9C, inner module (60) may include pillars (82) from proximal end (62) to distal end (66) that, for example, provide rigidity to inner module (60), help facilitate insertion of inner module (60) into housing (12), and help prevent inadvertent contact with cards (78).

As shown in FIGS. 10, 11, 13A and 13B, inner module (260) may comprise a chamber capable of receiving pest control material. The chamber may have a cylindrical shape, a rectangular shape or any other shape. Preferably, the chamber is the same shape as aperture (36). The walls of the chamber may be perforated with one or more holes (267) that may allow air to pass through them. The circulation of air through holes (267) may facilitate dispersing the pest control material inserted within the chamber. As discussed above, inner module (260) extends from proximal end (262) to distal end (266). A magnet (264) may be located at proximal end (262). In addition, or in the alternative, inner module (260) may have one or more bayonet connection pins (270) at proximal end (262) or at distal end (266) that are capable of mating with bayonet connection receptor slots (240) in the first end (20) and/or the second end (30) of housing (12). In the alternative, proximal end (262) and/or distal end (266) of inner module (260) may include screw threads (not shown) that are capable of mating with screw threads at first end (20) of housing (12) and/or within aperture (36), respectively.

In an alternate embodiment of the invention, instead of inserting an inner module into the lighting device, a chamber capable of receiving pest control material may be situated within the central region of housing (12). The chamber may extend from first end (20) to second end (30) of housing (12). The chamber may have a cylindrical shape, a rectangular shape or any other shape. The chamber may be perforated with one or more holes that may allow air to pass through them. The circulation of air through the holes may facilitate dispersing the pest control material inserted within the chamber. Pest control material may be inserted into the chamber through aperture (36) of second end (30), and may be contained within the chamber by a door or cap sealing aperture (36).

The pest control material may be an insect attractant, an insect repellant, and/or an adhesive. The pest control material may be removed from the chamber and replaced with new pest control material when, for example, the active ingredient of the pest control material has evaporated or is no longer effective, or when a number of insects have adhered to an adhesive that is at least a part of the pest control material.

The lighting device may further have one or more sound emitting components. An example of a commercially available sound emitting component can be found in the Aspectek Home Sentinel 5-in-1 Indoor Ultrasonic and Electromagnetic Pest Repellent. The sound emitting component(s) may be located within first end (20) and/or second end (30) of the housing (12). Each sound emitting component may comprise a sound generator and a speaker. Housing (12) may have one or more apertures or vents to facilitate emission of sound from the sound emitting components. The apertures or vents may also facilitate air circulation around the sound emitting components to enhance convection of heat away from the sound emitting components. For example, sound emitting components may be located within second end (30) and apertures or vents may be located on the surface of the second end (30) facing the first end (20).

Each sound emitting component may be capable of generating an ultrasonic sound. The ultrasonic sound may be in the form of short wavelength, high frequency sound waves that are too high in pitch to be heard by the human ear. For example, the sound emitted may have a frequency greater than 20,000 Hz. Because some animals, such as bats, dogs, rodents, and some insects, such as grasshoppers and locusts, can hear well into the ultrasonic range, the sound may repel insects and pests, while remaining inaudible to humans.

Lighting device (10) may further include one or more circuit boards electrically connected to the light sources (40) and/or sound emitting components, and electrically connected to connector (22) and/or batteries. The circuit board may be used to control the illumination of light sources (40) and/or the sound emitted from the sound emitting components. The circuit boards may control, for example, the brightness of one or more light sources (40) and/or the spectrum or temperature of light emitted by one or more light sources (40). The circuit boards may also control, for example, the frequency of sound emitted from the sound emitting components. Each circuit board may be contained within first end (20) or second end (30) of lighting device (10).

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. Further, it will be apparent to those of skill in the art that numerous changes may be made in such details without departing from the spirit and the principles of the invention. It should be appreciated that the invention is capable of being embodied in other forms without departing from its essential characteristics.

What is claimed is:

1. A lighting device comprising:
    a housing having a first end and a second end, said first end comprising a connector capable of mating with a light socket, said second end comprising an aperture and a sound emitting component, wherein said first end is connected to said second end with a plurality of pillars so as to define an intermediate space between said first end and said second end, said intermediate space in fluid communication with the space between each pillar;
    one or more light sources electrically connected to the connector; and
    a removable inner module comprising a proximal end and a distal end and one or more walls forming a chamber between said proximal end and said distal end, said walls having one or more apertures, said proximal end sized so as to be capable of being inserted through the aperture of the second end of the housing.

2. The lighting device of claim 1 wherein the inner module further comprises a first magnet.

3. The lighting device of claim 2 wherein the inner module further comprises bayonet connection pins.

4. The lighting device of claim 3 wherein said bayonet connection pins are located at the distal end of the inner module.

5. The lighting device of claim 2 wherein said first end of said housing further comprises a second magnet.

6. The lighting device of claim 2 wherein said first end of said housing further comprises a ferromagnetic material.

7. The lighting device of claim 1 wherein the connector is an E26 lightbulb screw base.

8. The lighting device of claim 1 wherein at least one light source is capable of emitting light with a temperature of approximately 2700K.

9. The lighting device of claim 1 wherein the sound emitting components are set to emit an ultrasonic sound.

10. The lighting device of claim 1 wherein said first end of said housing further comprises a second magnet.

11. The lighting device of claim 10 wherein the inner module further comprises a ferromagnetic material.

12. The lighting device of claim 1 wherein said first end of said housing further comprises a ferromagnetic material.

13. The lighting device of claim 1 wherein said inner module further comprises a handle.

* * * * *